Aug. 26, 1952 S. I. SHERR 2,607,986
SHEARS WITH TEETH FOR CUTTING ALONG ZIGZAG LINES
Filed Aug. 19, 1947
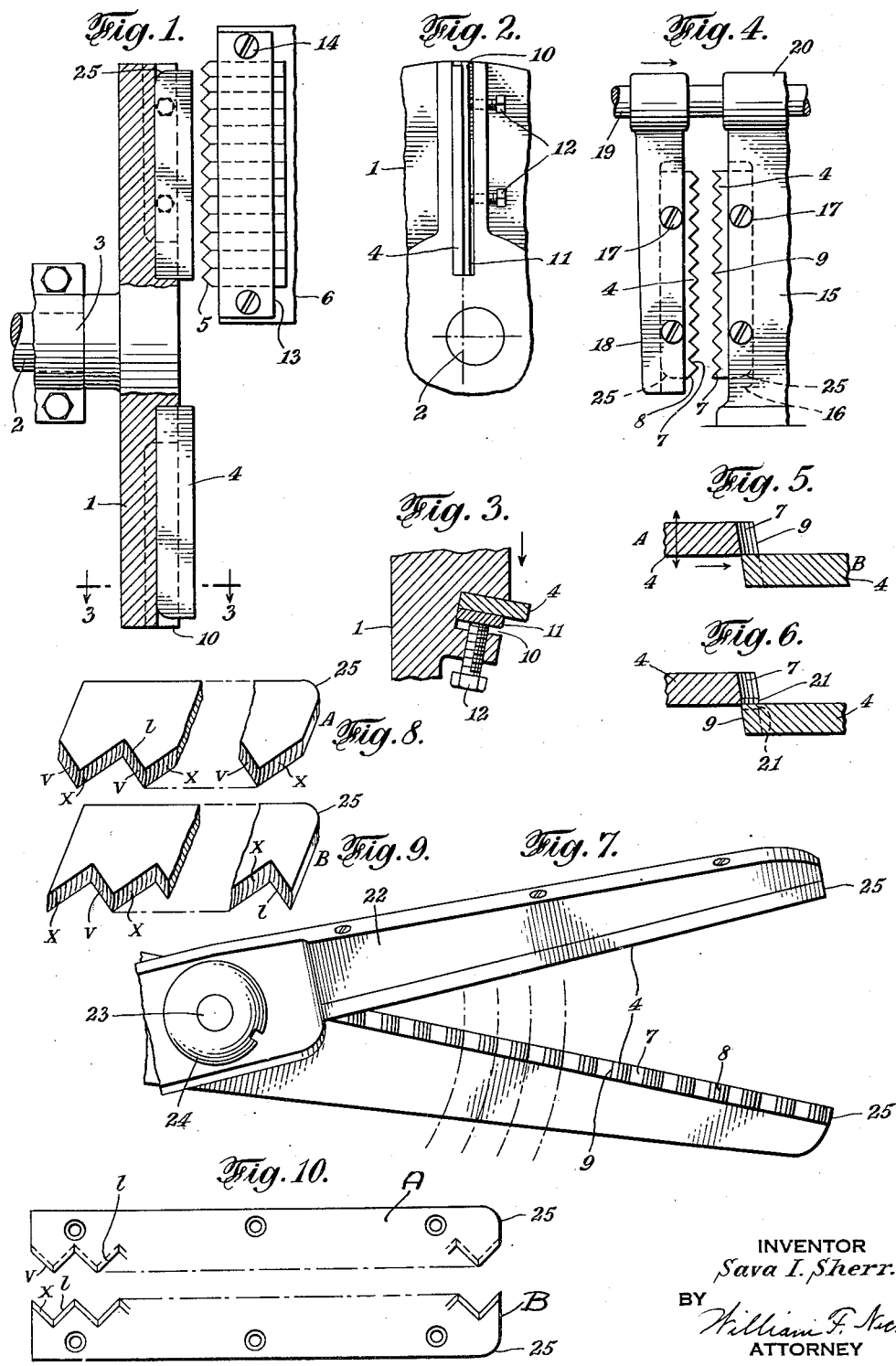
INVENTOR
Sava I. Sherr.
BY
William F. Nickel
ATTORNEY Patented Aug. 26, 1952

2,607,986

UNITED STATES PATENT OFFICE 2,607,986

SHEARS WITH TEETH FOR CUTTING ALONG ZIGZAG LINES

Sava I. Sherr, New York, N. Y., assignor to Samuel Briskman, New York, N. Y.

Application August 19, 1947, Serial No. 769,355

2 Claims. (Cl. 30—230)

This invention is an improvement in hand scissors or shears with teeth for severing cloth along zigzag lines to make a serrated instead of a straight edge.

The invention comprises a novel form of such shears that can be produced in a shorter time and with less work and labor and a smaller number of processing steps than have previously been required; and an important object of the invention is to provide shears of this kind of superior design at considerably reduced cost.

Previously in the manufacture of hand shears of this type, several metal strips or blanks were bunched together with their wide flat sides in contact and tilted in coinciding positions, and secured in operative relation to a rotary cylinder having sharp cutter projections on its circumference. The cylinder was revolved to carry the projections or cutter members, which had triangular pointed extremities with sharp inclined edges against one of the superposed edges of each blank and straight through the bunched blanks to form the teeth. The blades were fed sidewise toward the cylinder till the cutting was completed. These teeth thus had a triangular shape and their lateral faces were tilted at an angle to the opposite wide parallel faces or sides of the blade; also each tooth had lateral faces converging to a point or edge extending from one of the wide opposite faces of the blade to the other, and all projecting along one edge of the blade. Because the teeth were cut at an angle, the edges of each were sharper along one side or wide face of the blade than along the other, the sharper edges being the leading edges when the shears were finished. The blades then had to be "sheared" to some extent; that is each tooth was cut or shaved away, so as to form a small strip of surface along said acute leading edges that made a slight angle with the remainder of the lateral faces of the tooth. The blades were then "lapped" to impart to them, and especially to the narrow sheared surfaces, the proper finish to ensure smooth cutting by said teeth when the blades became part of a pair of pivotally united jaws and were moved bodily with respect to each other about the pivotal point; so that the teeth of one blade entered the triangular spaces between the teeth on the other.

These stages however, constituted a somewhat prolonged and expensive series of steps; and an important object of this invention is to provide blades for shears of this type at a much lower price, and in a relatively shorter period.

Another object of the invention is to provide hand shears with toothed blades having much better properties for cutting, adapted to make clean and neat zigzag edges in dividing or trimming cloth; and to give long, efficient and satisfactory service.

A further object is to provide toothed blades with teeth lapped and polished so thoroughly that preliminary grinding down or "shearing" of the leading edges of the teeth is not needed.

These and more objects and advantages are made clear in the following specification and the characteristics are pointed out in the appended claims. But the disclosure is explanatory or by way of example only, and in practice various changes in structural details and mode of operation can be adopted without deviation from the essential design and structure wherein the invention resides.

On the drawings,

Figure 1 is a view partly in section showing the operation of cutting teeth for shears according to my invention.

Figure 2 is a front elevation of part of the mechanism shown in Figure 1.

Figure 3 is a section on line 3—3 of Figure 1.

Figure 4 shows how the step of lapping and polishing is performed.

Figures 5 and 6 are diagrammatic views in section showing the result of the lapping process; the toothed blades locking as if in section along a line across the lower half of Figure 4, viewed from above.

Figure 7 shows in part a pair of finished shears embodying this invention; and

Figures 8, 9 and 10 are diagrammatic views showing details of the toothed blades for my improved shears.

The numeral 1 indicates a rotary disk or head adapted to be operated by a shaft 2, suitably supported in one or more bearings 3. This disk carries several strips or flat bars of metal or blanks 4, held in such position that they can be revolved past the triangular ends of a row of cutters 5, which are mounted on a support 6 and can be set close enough to the blanks to engage the edges thereof projecting out from the face of the disk 1 to form teeth, with lateral faces 7 and 8 intersecting in projecting edges 9. The disk and cutters 5 move relatively closer when the machine is in operation. The disk 1 has slots 10, in which the blanks 4 are made fast by locking bars 11, secured by screws 12. The slots are not radial, but so placed that if the center line were extended it would pass to one side of the axial center of the shaft 2, as indicated in Figure 2. The blades are thus offset from the axis of the shaft 2, for cutting, to the same extent as they are offset from the pivot joining the two halves or jaws of the finished shears when the blades are attached to said halves in their final positions. See Figure 7. Also the slots 10 are inclined somewhat to the front face of the disk, so that the triangular teeth are cut at a small angle to the wide opposite faces or flat sides of the blade, and the lateral faces 7 and 8 and the front edges 9 of the teeth are therefore inclined to said sides for say about ten degrees. The faces 7 and 8 will not be flat but are small elements of conical surfaces described with reference to the center of the shaft 2 as a common axis by the diagonal sides of the pointed ends of the cutters 5. A machine of such construction as to produce triangular teeth cut this way into the blades 4 is shown and described in my prior application, Serial No. 681,257, filed July 3, 1946 now Patent Number 2,537,164 issued January 9, 1951; and its structural characteristics are set forth in the claims of said application. The cutters 5 are made fast on the support 6 by a band 13 and screws 14, or other suitable means. The head 1 and support 6 approach slowly during operation, either or both being movable for this purpose.

To finish the teeth the blades 4 are worked in pairs as illustrated in Figure 4. The apparatus employed in this step comprises a fixed standard or post 15 having a vertical recess or slot 16 for one of the toothed blades 4; and a swinging arm 18 with a similar recess for another toothed blade 4. The blades are secured to the standard and the arm by screws 17 or other fastening means. The arm 18 is oscillated by a shaft 19; mounted in a bearing 20 at the top of the post 15.

The lapping is accomplished by operating the arm 18 to swing the toothed blade it carries from side to side past and in rubbing or grinding contact with the toothed blade on the standard 15. The teeth on these two blades, which are of equal length, are so located that the teeth on one enter the recesses between the teeth on the other. Thus the lateral faces 7 and 8 of the teeth are carried repeatedly into and out of frictional engagement. The blades are mounted in the post 15 and arm 18 as shown in Figures 5 and 6, and the lateral faces of the teeth rub against one another adjacent the more acute or advanced edges thereof. These edges are made acute because of the inclination of the teeth to the flat opposite sides of the blades, making them sharper along one flat side of the blade than the other. As a result the blades wear away these lateral faces a bit along the advanced or acute leading edges and produce a narrow strip of surface indicated at 21, which extends across the lateral faces 7 and 8 from one end of the blade to the other at the acute or leading edges thereof. The surface of this strip makes a minute angle with the remainder of the lateral surfaces 7 and 8. When the blades are mounted in a pair of shears as indicated in Figure 7, the two blades present their leading edges towards each other, and these edges effect the cutting of a piece of cloth or other material which is to be severed or trimmed. The blades in question can be attached in any suitable manner to the two halves 22 indicated in part in Figure 7, these halves or jaws being joined together by a pivot 23 secured by a nut or cap 24, the handles being at the other ends not shown in the drawings, to make the shears complete.

In practice, as set forth in my application, Serial No. 5,444, filed January 30, 1948, for patent on the apparatus and process for lapping toothed blades, the shaft 19, as it is rocked to swing the arm 18 from side to side with the two blades 4 in close proximity so that the faces 7 and 8 of the teeth on both come into rubbing contact, is also actuated so that this arm slides along the shaft 19 as the wearing away of the strip 21 proceeds. This axial feeding is stopped when the wearing away of the strip 21 is completed; but the swinging movement of the arm can continue a little further so as to polish and make perfectly smooth the narrow strips 21 along the teeth of the two blades. Also it will be noted that, as the arm swings, the acute or leading edges of the teeth on the metal strip 4 which it carries, will describe arcs and this motion would form these strips 21 on each of the lateral faces 7 and 8 of the teeth on the two blades in such manner as to make them elements of conical surfaces, which have the center of the shaft 19 as a common axis. The strips 21 would therefore assume such shape, even if the faces 7 and 8 of the teeth were not previously cut so as to be small elements of concentric conical surfaces. By forming the teeth as above described in connection with the operation of the apparatus shown in Figures 1, 2 and 3; and by making the faces 7 and 8 conical in the first place before the lapping is done, the lapping is rendered much easier and more effective and can be completed in a much shorter time.

This mode of operation is very advantageous and saves time in practice. A complete lapping operation for a pair of blades can be carried out in not over thirty minutes.

In the old method of making toothed blades for shears of this type where the cutters as they form the teeth, revolve about an axis parallel to the blades 4, the faces 7 and 8 of the teeth were not conical but were plain or flat, and they then had to be put through a preliminary shearing operation to form the narrow strips such as 21 along their leading or acute edges. The strips thus formed by shearing were made conical, with respect to an axis transverse to the wide flat sides of the blade, and at the right distance from one end, as described. This shearing operation required only a few minutes and the lapping not less than one hour and a half. Also the inclination of the teeth had to be about 25° to the flat wide opposite sides of the blades 4; and even after lapping, the hand shears containing the toothed blades were hard to cut with and the teeth tended to rub, bind or grind against the cloth when severing it.

The lateral faces of the teeth were inclined to the wide flat sides of the blades because the teeth on one blade always have to clear and pass those on the other. If the lateral faces of the teeth between the pointed outer ends 9 and the inner ends or roots of the teeth were not inclined but perpendicular to the opposite, parallel flat sides of the blades, the teeth with the blades close enough together to cut with their advance edges, would then bind along the opposite or trailing edges; and the proper action of the shears could not be obtained at all. The cutting back or inclining of the lateral faces enables the teeth to clear along the trailing edges; but with the blades set to pass as near as possible, the advance or leading edges of the teeth, which were sharper, would not always cut clearly because the leading edges of the teeth would always come closer at some points than others, especially if said edges were straight along the sides of the teeth; i. e., if the faces 7 and 8 are plane or flat.

The shearing of the teeth to produce a strip along the leading edges thereof like that shown at 4 in Figures 5 and 6 improves the operation of the shears, if the strips are all elements of conical surfaces having the common axis above mentioned. But if the remainder of the lateral faces 7 and 8 are still flat, the shear blades are still liable to bind, are harder to work with, and will often cut imperfectly and roughly.

With the process described herein all of the previous disadvantages are virtually eliminated, because the teeth are cut on circular arcs about the center of the shaft 2 as an axis and are formed so that each is an element of a separate conical surface as above stated. The inclination of the teeth need not be more than 10° and the strip of surface indicated at 21 does not have to be uniform in width; and yet the finished shears will work more easily and cut perfectly cleanly and smoothly in practice. The shears can also be finished and assembled more rapidly.

The effect of processing toothed blades in this manner is more clearly indicated in Figures 7, 8, 9 and 10. Each toothed blade is shown with a rounded corner 25 which may be taken as the outer end in the cutting or lapping stages and in the finished unit. In Figure 7 the sides or faces of the teeth 7, presented towards the axis of the pivot 23, which corresponds to the position of the axis of revolution at the center of the shaft 2 when the milling operation is in progress, will be elements of conical surfaces but will be slightly concave between their edges in the opposite flat sides of the blades; and the other faces 8 of the teeth which are presented toward the outer ends of the finished shears, will be conical, but slightly convex from leading edge to trailing edge. This appears more plainly in Figures 8 and 9. The shear blade marked A corresponds to the one carried by the arm 18 and the lateral faces of the teeth which are slightly concave crosswise from one flat side of the blade to the other are indicated at V, while the faces which are convex are indicated by X. The same is true of the blade B, corresponding to the one held in the post 15. The blades A and B are both so cut in the manner shown by Figure 1 that the bottom edges of the teeth in Figures 8 and 9 are the leading or sharper edges; the blades being tilted on the disk 1, as shown in Figure 3. In lapping, the rounded ends of the two blades are adjacent one another, and the teeth are so formed and situated in cutting, that the outer edge 9 of each tooth on one blade lies exactly at the intersection of two faces 7 and 8 of the teeth on the other, said intersection being at the inner ends or roots of the last-named teeth.

If the blade B in Figure 9 be visualized as it will appear if turned over horizontally about its rear edge in order to dispose the two blades A and B with their ends 25 still adjacent, so that the teeth of blade B are presented to the teeth on the other blade A, then these blades will be seen in the same relative positions they occupy in Figure 4, upon which the blade in the arm 18 presents its acute or leading edges to the observer; and the other having the same edge turned away from the observer; also the action is such that while the lapping continues the convex faces of the teeth on one blade and the concave faces of the teeth on the matching blade rub together, as Figures 8 and 9 prove. The strip 21 will thus be easily formed and will give the results desired whenever the finished shears are used for dividing cloth or trimming the same.

Figure 10 shows the blades as disposed in the finished shears on Figure 7. The ends with the curved corners 25 are at the outer ends of the shears. One blade indicated at A will be secured to the upper member with the teeth away from the observer. Seen from underneath this blade will appear as in Figure 10 with the acute or sharper leading edges of the teeth along the lower side. The other blade B will be secured in its place on the lower member in Figure 7 with its teeth turned towards the observer and its sharp leading edges on top in Figure 7. When the shears are made to cut, the leading edges of the teeth on the two blades slide past one another, but are very close together, the strips 21 on the teeth of the one blade conforming exactly to the separate strips respectively on the teeth of the other blade, leaving no spaces between them, and giving the cleanest cutting effect. In the apparatus of Figure 4 both blades are held in the same non-radial positions as described in connection with Figures 2 and 7.

Each convex lateral face 8 on the teeth of either blade cooperates with the concave face of a tooth 7 on the other blade. This is made plain by Figures 8 and 9. Consider for example the tooth at the right on blade A. The face thereof at the right is convex across the width thereof, that is from one wide side of the blade to the other, and it will pass the concave face of the half tooth on the end of blade B, and so with all the other lateral faces on the two blades. In theory, each convex face and its associated concave face will be elements of one and the same conical surface, the convexity being outside and the concavity inside thereof. If perfect uniformity could be had, the convex faces and the matching concave faces would move past each other in close contact over their entire extent, and the leading edges would cut or shear the cloth along a zigzag or serrated edge with the utmost nicety, even if the faces 7 and 8 were not inclined, and not even lapping would be necessary. The shearing effect would be efficient to the last fraction of a degree, and the concave or arc-shaped strip 21 also would not be required. However, perfect uniformity in dimensions and degree of curvature is not possible of attainment. These blades have to be produced in quantity by machine; and in the operation of machines there are always variations in result, due to differences in the hardness and other properties of the metal stock; the cutters used; idiosyncrasies, so to speak, in the movement of parts of the apparatus, such as might be brought about by one bearing or connection having a microscopically larger or smaller fit, and other causes. The variations might amount to only a few thousandths of an inch; but they will be sufficient to prevent the full realization of the ideal relationship between the convex and concave surfaces of the faces of the teeth on the two blades.

To enable corrections to be most easily and conveniently made to compensate for errors of the kind just pointed out, the concave and convex faces 7 and 8 are therefore inclined when first cut by the members 5; and about ten degrees is chosen as most suitable for this purpose. This tilting or inclination is only a small departure from a perpendicular position with respect to the wide flat opposite sides of the blades 4. With the concave and convex lateral faces 7 and 8 inclined to this extent, and no more, all the advantages enumerated above can be gained. But it is quite within the realm of possibility that this angle can be diminished; if mechanical apparatus capable of a greater approach to perfect uniformity in operation and result can be designed and built.

During the lapping operation as carried out with the apparatus including the structure shown in Figure 4, the distance between the axis of the shaft 19 and the adjacent ends of the two blades is the same as the distance from the axis of the shaft 2 to the inner ends of the blades in the operation of cutting the teeth, and this distance is also exactly the same as the distance between the inner ends of the blades and the axis of the pivot 23 in the finished shears carrying the blades.

Having described my invention, what I believe to be new is:

1. A shear blade of uniform width and thickness with teeth to sever sheet material along a serrated line, said blade having parallel opposite flat sides, said teeth extending through the blade from one side to the other and having ends lying in the planes of said sides, and lateral faces which are elements of concentric conical surfaces inclind at not more than ten degrees to said sides, the intersection of said faces with one of said sides forming relatively acute edges, and a narrow strip of surface on each of said faces extending along the acute edge thereof, said strip having a width of much less than half the thickness of said blade.

2. A shear blade of uniform width and thickness with teeth to sever sheet material along a serrated line, said blade having parallel opposite flat sides, said teeth extending through the blade from one side to the other and having ends lying in the planes of said sides, and lateral faces which are elements of concentric conical surfaces inclined at not more than ten degrees to said sides, the intersection of said faces with one of said sides forming relatively acute edges, and a narrow strip of surface on each of said faces extending along the acute edge thereof, said strip having a width of much less than half the thickness of said blade, said conical surfaces being alternately concave and convex over the lateral faces of the teeth.

SAVA I. SHERR.

REFERENCES CITED

The following references are of record in the file of this patent:

UNITED STATES PATENTS

| Number | Name | Date |
|---|---|---|
| 1,965,443 | Wyner et al. | July 3, 1934 |
| 1,970,408 | Weidauer | Aug. 14, 1934 |
| 2,268,626 | Sigoda | Jan. 6, 1942 |
| 2,387,053 | Brown | Oct. 16, 1945 |